US008152120B2

(12) United States Patent
Barrett et al.

(10) Patent No.: US 8,152,120 B2
(45) Date of Patent: Apr. 10, 2012

(54) MULTIPURPOSE SUPPORT FOR ATTACHMENTS MOUNTABLE TO THE TOW HITCH OF A VEHICLE

(75) Inventors: Michael Barrett, Buncrana (IE); Sean Doherty, Moville (IE)

(73) Assignee: Barwall Limited, Buncrana, Co. Donegal (IE)

( * ) Notice: Subject to any disclaimer, the term of this patent is extended or adjusted under 35 U.S.C. 154(b) by 266 days.

(21) Appl. No.: 11/992,707

(22) PCT Filed: Sep. 29, 2006

(86) PCT No.: PCT/IE2006/000105
§ 371 (c)(1),
(2), (4) Date: Sep. 9, 2009

(87) PCT Pub. No.: WO2007/036921
PCT Pub. Date: Apr. 5, 2007

(65) Prior Publication Data
US 2010/0019122 A1   Jan. 28, 2010

(30) Foreign Application Priority Data
Sep. 30, 2005  (IE) .................................... 2005/0655

(51) Int. Cl.
*F21V 35/00*  (2006.01)

(52) U.S. Cl. ........... 248/226.11; 248/229.14; 248/230.5; 248/231.51; 248/228.5; 248/231.61; 248/316.5; 248/316.6; 248/229.13; 248/229.23; 248/228.4; 248/230.4; 280/512

(58) Field of Classification Search .................. 248/495, 248/494, 501, 502, 416.1, 500, 493, 229.14, 248/230.5, 226.11, 228.5, 231.61, 231.85, 248/316.5, 316.6, 229.13, 229.23, 228.4, 248/230.4, 231.51
See application file for complete search history.

(56) References Cited

U.S. PATENT DOCUMENTS

| | | | | |
|---|---|---|---|---|
| 487,165 A * | 11/1892 | Straley | .................. | 248/229.13 |
| 869,880 A * | 11/1907 | Conrad | .......................... | 24/516 |
| 1,178,784 A * | 4/1916 | Davis | ............................ | 451/406 |
| 2,088,153 A * | 7/1937 | Draeger | ...................... | 280/502 |
| 2,195,366 A * | 3/1940 | Haigh | ............................ | 108/44 |
| 2,693,970 A * | 11/1954 | Coleman et al. | ............. | 280/512 |
| 2,723,866 A * | 11/1955 | Hollingsworth | ............. | 280/512 |
| 2,855,222 A * | 10/1958 | Bolmes et al. | ................ | 280/512 |
| 3,446,520 A * | 5/1969 | Gibson et al. | ................. | 280/512 |
| 4,030,691 A * | 6/1977 | Fleshman | ................ | 248/231.61 |
| 4,209,184 A * | 6/1980 | Byers | ............................ | 280/511 |
| 4,576,395 A | 3/1986 | Longoria | ...................... | 280/511 |
| 4,618,058 A * | 10/1986 | Gregg et al. | .................. | 206/291 |
| 4,657,276 A * | 4/1987 | Hamerl | ........................ | 280/512 |
| 5,082,037 A | 1/1992 | Hammons et al. | ............ | 144/286 |
| 5,184,911 A * | 2/1993 | Wu | ................................ | 403/385 |
| 5,205,666 A * | 4/1993 | Hollis | ............................ | 403/24 |
| 5,482,309 A * | 1/1996 | Hollis | ........................ | 280/423.1 |

(Continued)

FOREIGN PATENT DOCUMENTS

EP   0 710 588   5/1996

(Continued)

*Primary Examiner* — Nkeisha Smith
(74) *Attorney, Agent, or Firm* — Kusner & Jaffe

(57) ABSTRACT

A multipurpose support for attachments mountable to the tow hitch of a vehicle. The support comprises a main body adapted to receive an attachment and a coupling means for a quick release coupling of the main body to the tow hitch of a vehicle.

14 Claims, 5 Drawing Sheets

U.S. PATENT DOCUMENTS

| | | | | |
|---|---|---|---|---|
| 5,887,710 A | * | 3/1999 | London et al. | 206/289 |
| 5,890,739 A | | 4/1999 | Cogswell, Sr. | 280/769 |
| 6,000,710 A | * | 12/1999 | Schocker et al. | 280/507 |
| 6,474,900 B2 | * | 11/2002 | Feng | 403/322.4 |
| 7,350,760 B2 | * | 4/2008 | Yamaura | 249/219.1 |
| 7,726,618 B2 | * | 6/2010 | Pedemonte | 248/288.51 |
| 2001/0050326 A1 | * | 12/2001 | Muroto | 248/226.11 |
| 2003/0080267 A1 | * | 5/2003 | Eslick | 248/229.1 |

FOREIGN PATENT DOCUMENTS

| | | |
|---|---|---|
| EP | 1 170 178 | 1/2002 |
| EP | 1 538 027 | 6/2005 |

\* cited by examiner

MULTIPURPOSE SUPPORT FOR ATTACHMENTS MOUNTABLE TO THE TOW HITCH OF A VEHICLE

FIELD OF THE INVENTION

The present invention relates to a support which can be mounted to a vehicle. More particularly, the invention relates to a support which can be attached to the tow hitch of any vehicle and used to support an extensive range of attachments, for use in a wide range of commercial, industrial and leisure purposes.

BACKGROUND TO THE INVENTION

Within the construction industry, workers can often find themselves located in a remote area, with no access to a work surface needed for the job in hand. As a result, ad-hoc work surfaces are often improvised out of necessity. However, it will be appreciated that this is not an ideal solution, due to health and safety and insurance issues. To prevent such issues arising, the choice is often to return to base to carry out even the most simple of mechanical tasks, despite the fact that it often results in the loss of a substantial amount of production time.

UK Patent No. GB2279866 describes a work surface mounted in a vehicle which is movable by sliding and pivoting between a storage position and a use position. U.S. Pat. No. 5,267,748 describes a vehicle tool platform where the plane of the platform is at a height generally level with the floor of the van to which the work platform apparatus is to be secured. The other end of the platform is adapted to be received and secured by a rear trailer hitch of the vehicle. However, in both of these patents the work surface has the disadvantage of being permanently affixed to a vehicle.

It will be appreciated therefore that it is very desirable to be able to use a variety of work tools on remote sites where no supporting infrastructure is available.

OBJECT OF THE INVENTION

The present invention seeks to overcome the aforementioned problems and provide a multipurpose support for attachments mountable to a vehicle.

SUMMARY OF THE INVENTION

The present invention provides a multipurpose support for attachments mountable to the tow hitch of a vehicle comprising a main body adapted to receive an attachment and a coupling means for a quick release coupling of the main body to the tow hitch of a vehicle.

By providing a support for an attachment which can be coupled to a tow hitch by quick release, the support can be detached and reattached effortlessly to the tow hitch of vehicle at any location as required, and used to support a variety of attachments, each designed to facilitate one or more particular tasks.

Preferably, the coupling means is moveable between a clamped position, in which position a tow hitch can be secured by the coupling means to the main body, and an unclamped position, in which position a tow hitch located in the coupling means is removeable from the coupling means.

The coupling means may comprise a moveable clamping portion and a fixed clamping portion, wherein in the unclamped position the moveable clamping portion and fixed clamping portion are sufficiently spaced apart from each other to enable a tow hitch to be inserted between the two portions, and in the clamped position, the moveable clamping portion and the fixed clamping portion are coupled together to enable a tow hitch to be secured in between the two portions.

The support may further comprise a lever for activation of the coupling means to move between the clamped and the unclamped positions.

The support may further comprise a securing means, whereupon activation of the lever from the unclamped to the clamped position causes the securing means to act on the moveable clamping portion to pivot it from a position in which the moveable clamping portion and the fixed clamping portion are spaced apart from each other to a position in which the moveable clamping portion is coupled to the fixed clamping portion.

Preferably, the lever comprises a handle connected to a pair of side portions, the side portions being pivotably attached to either side of the fixed clamping portion, and whereupon movement of the handle between the unclamped and clamped positions causes the longitudinal axes of the side portions to pivot from a location parallel to the longitudinal axis of the main body to a location perpendicular to the longitudinal axis of the main body.

The securing means may be attached to the side portions of the lever, and whereupon movement of the handle from the unclamped to the clamped position causes the securing means to pivot with the side portions of the lever and act on the moveable clamping portion to pivot it towards the fixed clamping portion.

The securing means may comprise a U shaped catch comprising a U shaped portion and two joining portions, wherein the U shaped portion surrounds the moveable clamping portion and the joining portions extend adjacent the sides of the fixed clamping portion to the side portions of the lever.

Preferably, the support further comprises an urging means for urging the moveable clamping portion coupled to the fixed clamping portion when in the clamped position.

The fixed clamping portion may comprise a hemispherical portion shaped to receive one half of a tow hitch, and the moveable clamping portion may comprise a hemispherical portion shaped to receive the other half of a tow hitch.

The support may further comprise a collar surrounding the main body to which the coupling means is attached.

The support may further comprise a locking means provided on the collar, the locking means moveable between an open position, in which position the main body is moveable within the collar, and a closed position, in which position the main body is locked at a position within the collar.

Preferably, the main body comprises a shaft having one end adapted to receive an attachment.

The invention also provides an attachment for attaching to the support, the attachment comprising a work surface and at least one mounting shaft, the mounting shaft adapted to be received by the main body of the support.

The provision of the work surface enables a user to carry out one or more particular tasks which the attachment was adapted to facilitate when the attachment is attached to the support.

The attachment may further comprise a locking means, the locking means moveable between an open position, in which position the mounting shaft may be removed from the main body of the support when the attachment is attached to the support, and a closed position, in which position the mounting means may be secured to the main body of the support.

The work surface may comprise a vertical and a horizontal plate, each of which are provided with a mounting shaft.

In one embodiment, the attachment may be a vice bracket.

In another embodiment, the attachment may be a platform.

In a further embodiment, the attachment may be a road sign.

Preferably, the attachment is rotatable about the longitudinal axis of the support.

The invention also provides support for attachments mountable to the tow hitch of a vehicle comprising a main body to which an attachment is attached; and a coupling means for coupling the main body to the tow hitch of a vehicle.

DETAILED DESCRIPTION OF THE DRAWINGS

Figure 1:
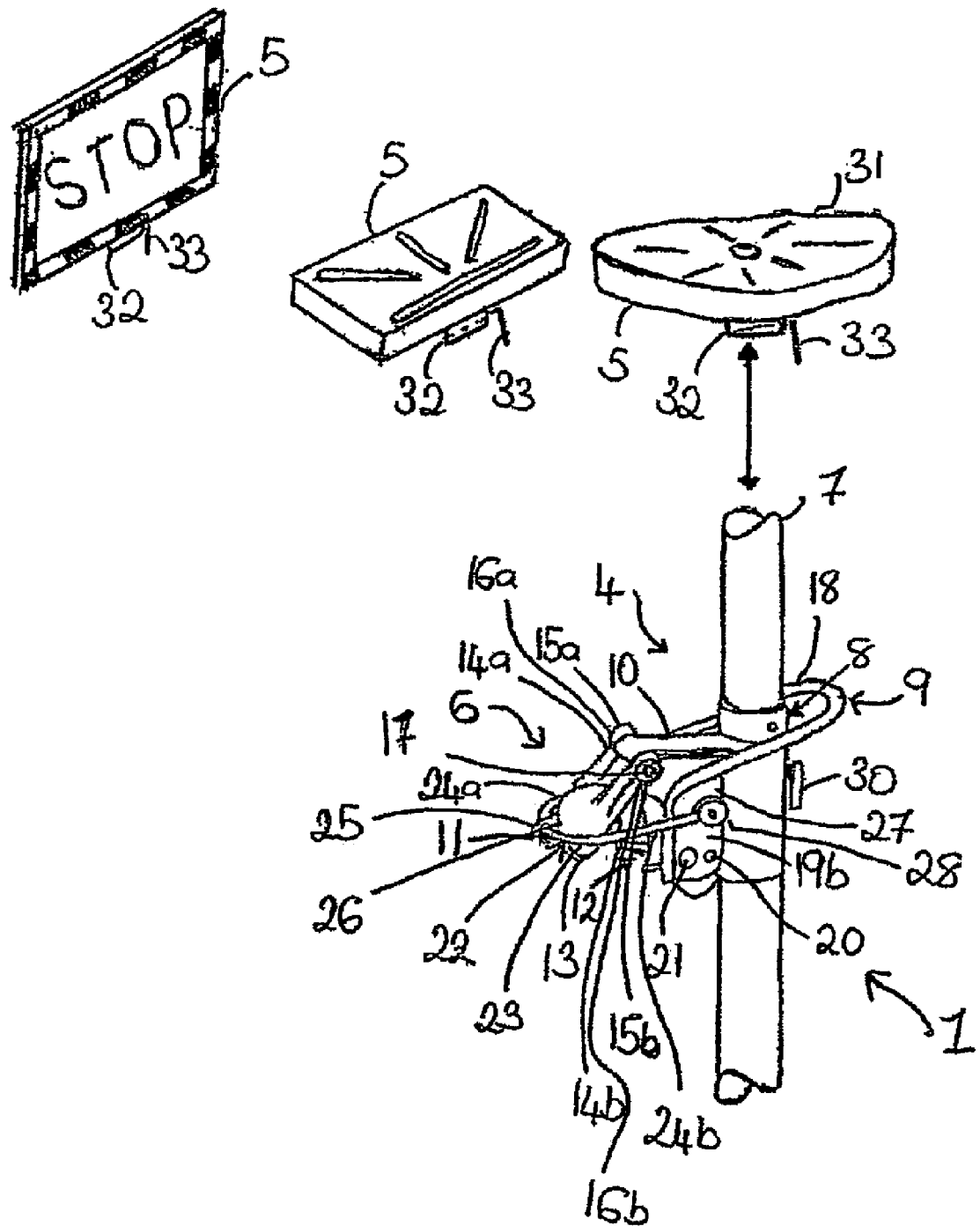
FIG. 1 shows a perspective view of the support of the present invention when the clamp is in the unclamped position.

The present invention will now be described with reference to the accompanying FIGS. 1 to 5.

FIGS. 1 to 5 detail the support 1 of the present invention for attachment to the tow hitch or tow bar of a vehicle. In the embodiment shown takes the form of a tow ball 2. The support 1 comprises a main body 4 adapted to receive an attachment 5 and a coupling means 6 for coupling the support 1 to the tow ball 2 of a vehicle 3.

In the described embodiment, the main body takes the form of a shaft 4. One end 7 of the shaft 4 is adapted to receive an attachment 5. A collar 8 surrounds a portion of the shaft 4 and has the coupling means 6 attached thereto.

The coupling means comprises a clamp 6 which is dimensioned to receive a tow ball 2 of a vehicle 3. A lever 9 acts on the clamp 6 to secure and release the clamp 6 to and from the tow ball 2.

The clamp 6 comprises two halves, a fixed clamping portion 10 and a moveable clamping portion 11.

The fixed clamping portion 10 is provided with a hemispherical portion 12 which is shaped to receive one half of a tow ball.

The moveable clamping portion 11 is provided with a corresponding hemispherical portion 13 which is shaped to receive the other half of a tow ball. Longitudinal connecting portions 14a, 14b extend from each side of the portion 13, each of which is provided with a bore 15a, 15b at their free end 16a, 16b to enable pivotable attachment of the moveable clamping portion 11 to the fixed clamping portion 10 via a pin arrangement 17 located on the fixed clamping portion 10.

The moveable clamping portion 11 is moveable by action of the lever 9 between a clamped position, in which position portions 12 and 13 of the fixed and moveable clamping portions are coupled together so as to form a substantially spherical shape for securing a towball between them, and an unclamped position, in which position portions 12 and 13 are sufficiently spaced apart from each other in order to enable a towball to be inserted and removed from between the two portions, as will be described in further detail below.

Figure 2:
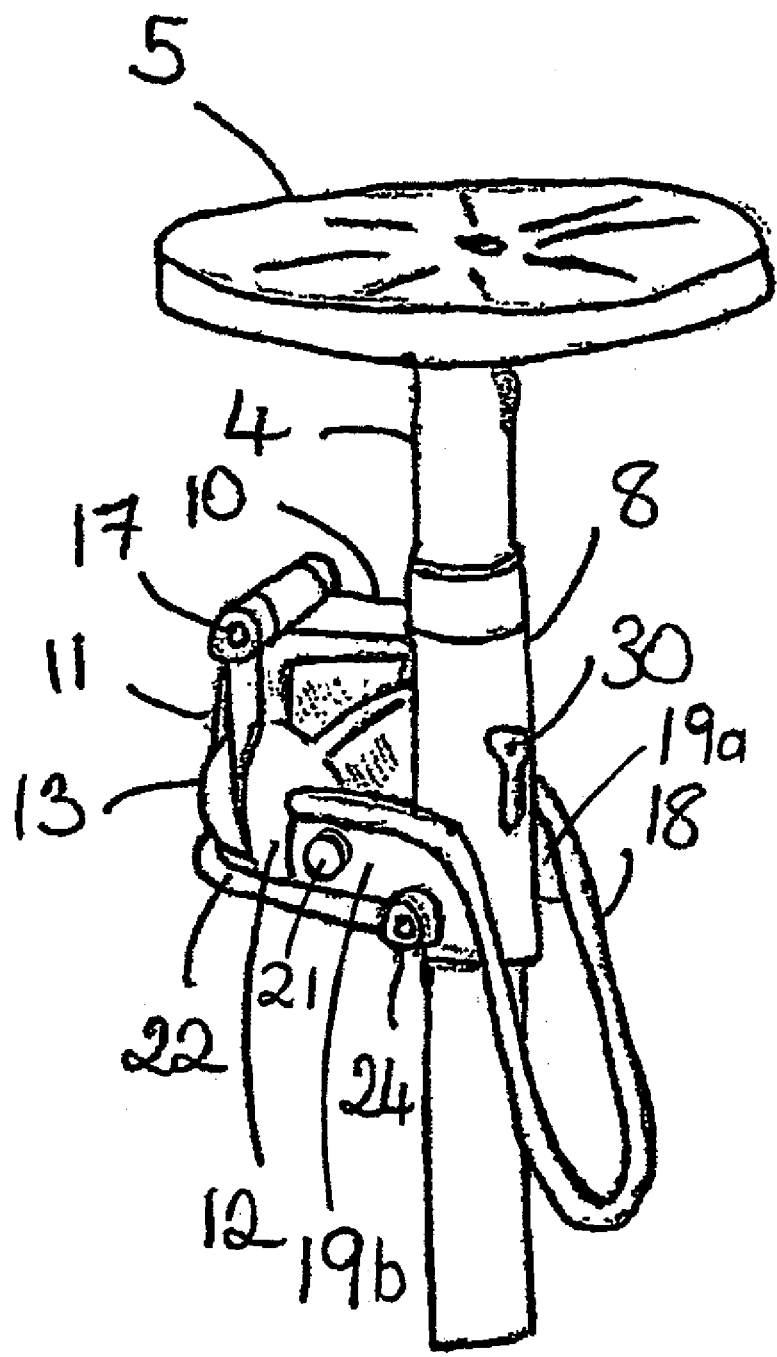
FIG. 2 shows a perspective view of the support of the present invention when the clamp is in the clamped position.
Figure 3:
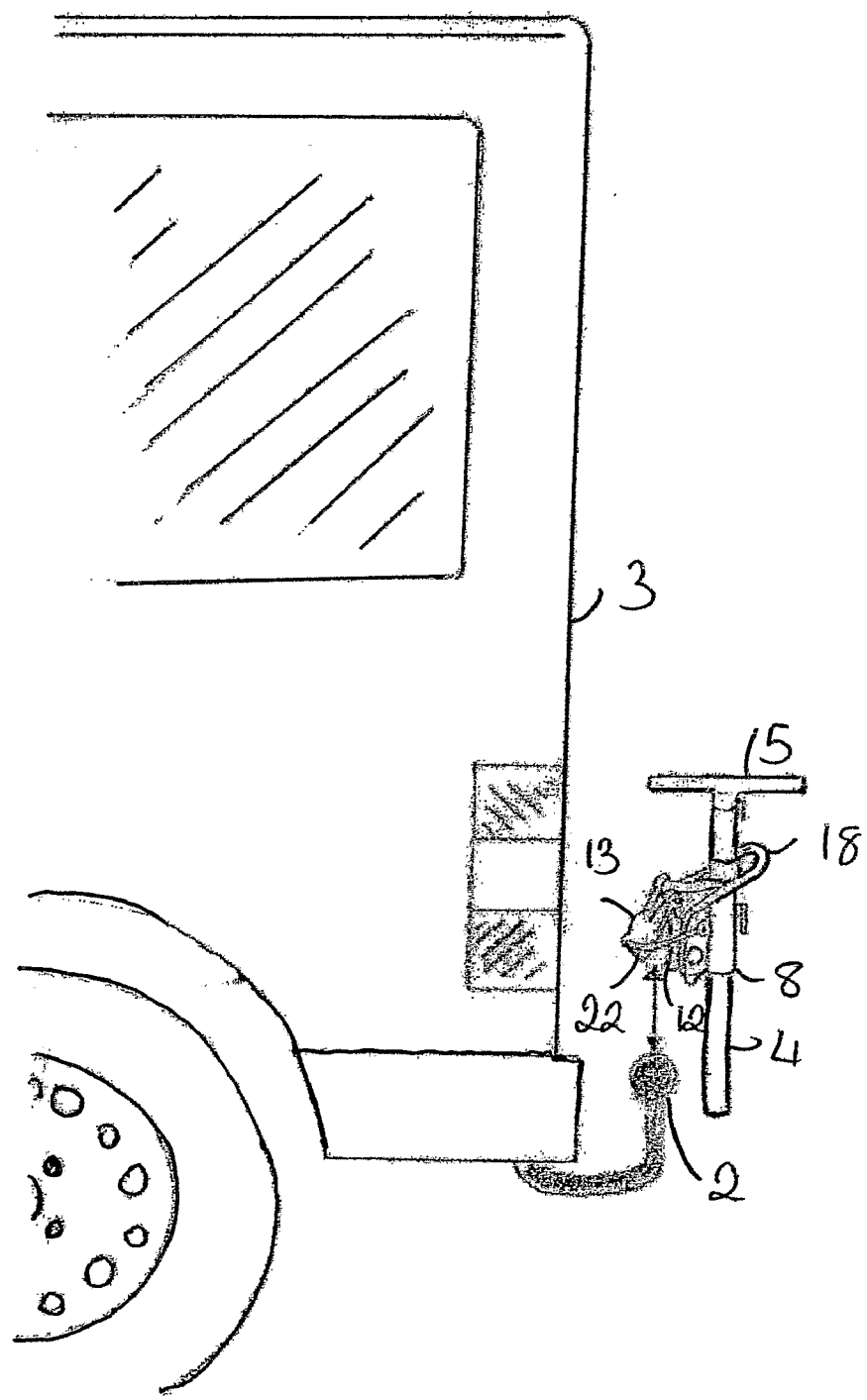
FIG. 3 shows a view of the support when the clamp in its unclamped position being fitted to the towball of a vehicle.
Figure 4:
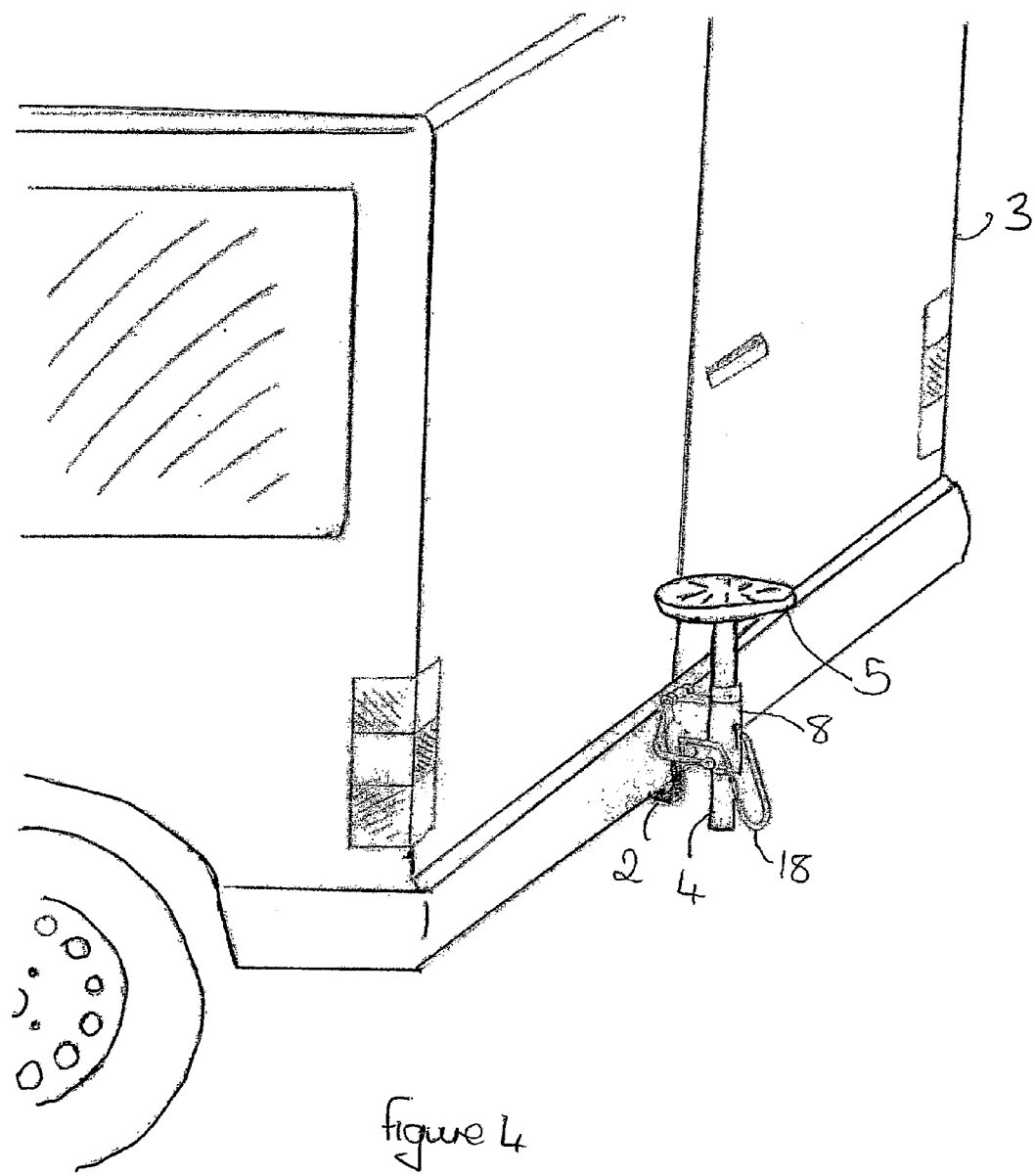
FIG. 4 shows a view of the support when the clamp is in its clamped position and clamping the towball of a vehicle.
Figure 5:
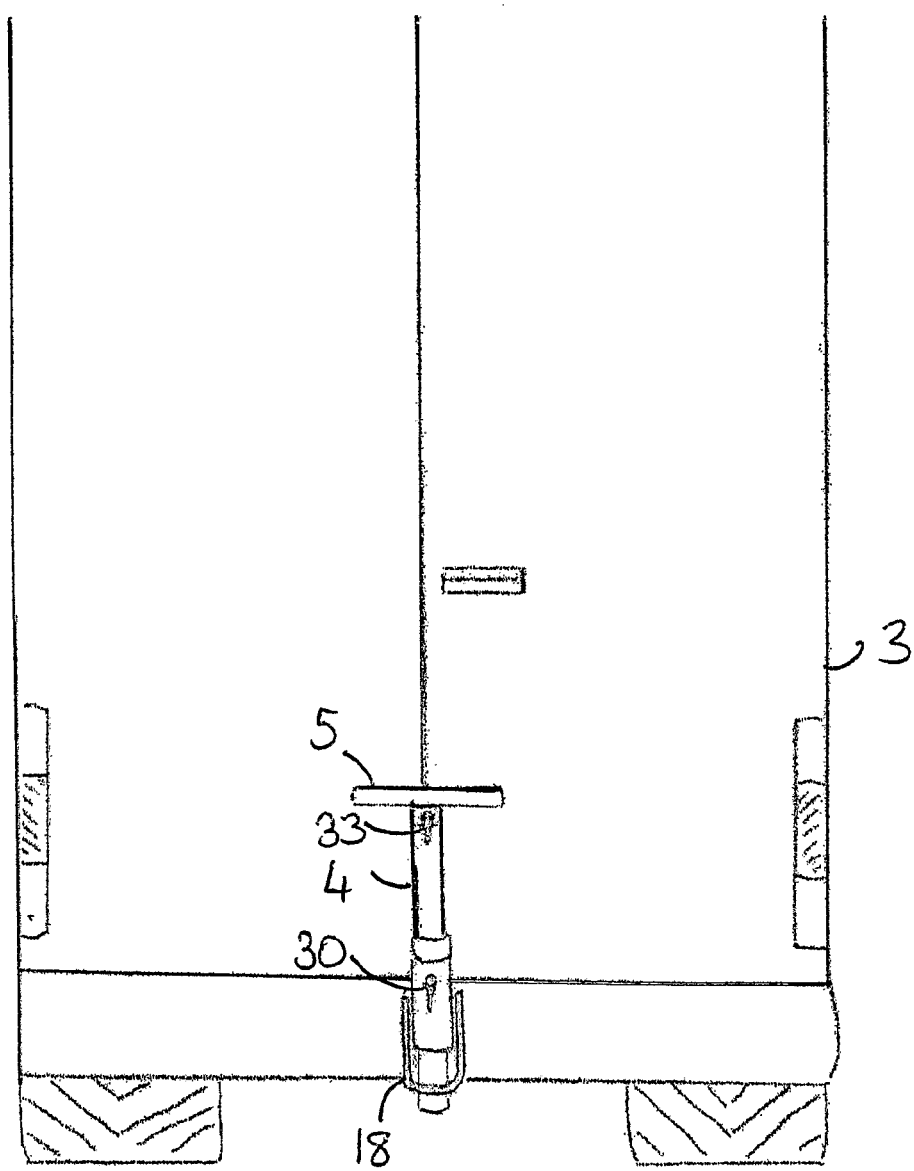
FIG. 5 shows a front view of the support when the clamp is in its clamped position and clamping the towball of a vehicle.

The lever 9 comprises a handle portion 18 connected to a pair of side portions 19a, 19b. The side portions 19a, 19b are pivotably attached to either side of the fixed clamping portion 10 of the clamp 6. In the described embodiment, this pivotable attachment is provided by a pin 20. In the unclamped position, the longitudinal axis of the side portions 19a, 19b are located parallel to the longitudinal axis of the shaft 4, as can be seen from FIG. 1. However, when a force is applied to the handle 18 in order to move the lever 9 from the unclamped to the clamped position, it causes the side portions 19a, 19b to pivot about the pin 20 such that the longitudinal axes move to a location perpendicular to the longitudinal axis of the shaft 4, as is shown in FIG. 2.

A securing means provides for the coupling together of the portions 12 and 13 of the fixed 10 and moveable 11 clamping portions of clamp 6, upon activation of the lever 9 to the clamping position. In the described embodiment, the securing means is in the form of a U shaped catch 22 having a U shaped portion 23 and two joining portions 24a, 24b. The U shaped portion 23 of the catch 22 surrounds portion 13 of the moveable clamping portion 11 and is attached to its surface at a point 26 by means of a connector 25, as can be seen from the figures. Each joining portion 24 of the catch 22 then extends adjacent to one of the opposing sides 27 of the fixed clamping portion 10 to a side portion 19a, 19b of the lever 9. The joining portions 24 are then pivotably attached to the side portions 19a, 19b by means of a pin 28.

As previously described, when the lever 9 is in the unclamped position, the longitudinal axes 4 of the side portions 19a, 19b of the lever 9 are located parallel to the longitudinal axis of the shaft 4. In this position, the securing means 22 attached to the side portions 19a, 19b of the lever 9 is located relative to the clamp 6 such that it surrounds both the moveable clamping portion 11 and the fixed clamping portion 10 with portions 12 and 13 sufficiently spaced apart from each other so as to allow a towball to be inserted and removed from the clamp 6. Accordingly, the clamp 6 is said to be in the unclamped position.

Conversely, when the lever 9 is pivoted from the unclamped to the clamped position by applying pressure to the handle 18, the side portions 19a, 19b of the lever 9 are pivoted about pin 20 so as to move to a location perpendicular to the longitudinal axis of the shaft 4. It will be appreciated that this causes the securing means 22 attached to the side portions 19a, 19b of the lever 9 to also pivot, which in turn has the effect of pivoting the moveable clamping member 11 about pin arrangement 17 so as to move its portion 13 towards and into a coupling with the portion 12 of the fixed clamping member 10, as can be seen from FIG. 2.

An urging means in the form of a spring lock 21 is also provided on the side portions 19a, 19b of the lever 9. This spring lock 21 is arranged such that movement of the lever 9 into the clamped position activates the spring lock 21 to urge the portion 13 of the moveable clamping portion 11 and the portion 12 of the fixed clamping portion 10 towards the coupling position. Movement of the lever 9 from the clamped to the unclamped position is thus only possible once sufficient force is applied to the handle 18 in order to overcome the tension in the spring lock 21.

In order to enable the height of the support 1 above ground level to be varied in accordance with the intended use of the support 1, the portion of the shaft 4 which is located above and below the collar 8 is adjustable by a locking means located on the collar 8. In the described embodiment, the locking means takes to form of a handle 30, which can be rotated between an open and a closed position. In the open position, the shaft 4 is moveable along the inner bore of the collar 8. In the closed position, the shaft 4 is locked at a particular position within the collar 8.

It will be appreciated that a number of alternative embodiments of the main body could equally well be used in order to provide for an adjustment in height of the support 1. For example, the main shaft could instead be a telescopic shaft having two hollow shafts moveable relative to each other. The height of the main shaft could then be adjusted as required between a retracted position, in which position one shaft is located entirely within the other shaft, and an extended position, in which position one shaft extends above the other.

The support 1 of the present invention is adapted for use with an extensive range of specifically designed attachments. FIG. 1 shows one such attachment which may be used with the support, namely a vice bracket. The vice bracket comprises a work surface 31 and a mounting shaft 32, dimensioned to enable it to be received by end 7 of the shaft 4. A locking means is attached to the mounting shaft 32, to lock the mounting shaft 32 in position within the shaft 4 of the support 1 once the bracket is attached to the support 1. In the described embodiment, the locking means is a handle 33 which is rotatable between an unlocked position, in which position the mounting shaft 32 may be removed from the shaft 4, and a locked position, in which position the mounting shaft 32 is locked to the shaft 4.

The invention will now be illustrated using the vice bracket as the exemplary attachment to be attached to the support. To attach the vice bracket 5 to the support 1, the mounting shaft 32 must be positioned into the receiving end 7 of the shaft 4 with the handle 33 in the unlocked position. The vice bracket 5 can then be secured into position by rotation of the handle 33 to the locked position. If required, the height of the support 1 above ground level may then be adjusted, by opening the handle 30 located on the collar 8, and moving the shaft 4 until the desired portion of the shaft 4 is located above the collar 8. The handle 30 can then be rotated to lock the shaft 4 to the collar 8 at this position.

Once the attachment 5 is attached to the support 1, the support 1 is ready for coupling to the tow ball 2 of a vehicle 3.

The first step is to ensure that the lever 9 in the unlocked position. In this position, the U shaped catch 22 surrounds both the moveable clamping portion 11 and the fixed clamping portion 10, with the portions 12 and 13 sufficiently spaced apart from each other so as to allow a towball 2 to be inserted between the two portions. The support 1 should then be moved until the towball 2 is positioned in between the portion 13 of the moveable clamping portion 11 and the portion 12 of the fixed clamping portion 10.

The lever 9 should then be moved into the locked position by applying force to the handle 18. This causes the side portions 19a, 19b of the lever 9 to pivot about the pin 20 until they are located at a position perpendicular to the longitudinal axis of the shaft 4. This causes in turn the U shaped catch 22 to act on the portion 13 of the moveable clamping portion 11 so as to pivot it towards the portion 12 of the fixed clamping portion 10 until the two clamping portions make contact with each other. This causes the spring lock 21 to activate to maintain the portion 13 of the moveable clamping member 11 coupled to the portion 12 of the fixed clamping member 10. In this position, the towball 2 is securely located in between the two clamping members of the clamp 6, with the clamp 6 gripping the entire surface area of the tow ball 2.

It will be appreciated that the vice bracket 5 could equally well be attached to the support 1 after the support 1 is coupled to the tow ball 2 of a vehicle.

Once attached, the weight of the vehicle 3 supports the vice bracket 5 without the need for any additional securing means to secure the attachment safely in position. Accordingly, the vice bracket 5 is now ready to be used to support a vice, by bolting a vice to the vice bracket.

The removal of the support 1 from the towball 2 is the reverse of the attachment process. To remove the support 1, the lever 9 should be moved from the locked position to the unlocked position by means of the handle 18. This causes the side portions 19a, 19b of the lever 9 to pivot to a location parallel to the longitudinal axis of the shaft 4. This in turn acts on the U shaped catch 22 to cause the moveable clamping portion 11 to pivot against the action of the spring lock 21 so that its portion 13 moves away from the portion 12 of the fixed clamping portion 10 to create a space between the moveable clamping member 11 and the fixed clamping member 10, with the towball 2 no longer secured between the two clamping members. The process should then be completed by moving the support 1 in a direction away from the tow bar 2 of the vehicle 3, so as to completely remove the towball 2 from the coupler 6. The support 1 can then be stored away from the tow bar 2 and/or vehicle 3 as desired.

It will be appreciated that any type of attachment could be used with the support, depending on the requirements of a user. For example, an alternative attachment could comprise a mobile work surface. The work surface may incorporate both a vertical and a horizontal mounting plate, each having their own mounting portion, to facilitate the mounting of either the vertical or the horizontal plate to the support, both of which are dimensioned to be received by the receiving portion of the shaft 4.

The attachment could alternatively be adapted to facilitate the secure use or storage of a wide range of tools, such as for example mechanical tools, technical equipment, laptops, temporary road signage, photographic equipment, household products and hazardous materials. Each attachment may be attached to the support in the same manner as that described above for the vice bracket. However, an alternative means of attachment of the attachment to the support could equally well be used, such as for example by means of screws.

The attachment may also be adapted to facilitate a 360 rotation about the longitudinal axis of the support.

In an alternative embodiment, the clamp may be further secured to the tow ball once in the clamped position by a lock and key arrangement.

The clamp may be adapted for use with a standard vehicle towball. Alternatively, the clamp could be adapted for use with a detachable vehicle tow bar system. It will also be appreciated that the invention is not limited to use only with a spherical-shaped tow ball, and it could be adapted for use with any size and shape of two hitch instead.

The present invention provides a mobile support which is adapted for use with the tow hitch of any vehicle. Furthermore, the support can be detached and reattached effortlessly to the towball of vehicle at any location as required, due to its quick release functionality. The result is the provision of a safe and stable production/multi-purpose surface that can securely support a substantial amount of weight. In addition, the support also creates additional secure storage areas outside the vehicle.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A multipurpose support for a variety of attachments mountable to a tow ball of a vehicle comprising:
  a main body adapted to receive a variety of attachments;
  a coupling means for a quick release coupling of the main body to the tow ball of the vehicle, wherein the coupling means is moveable between a clamped position, in which position the tow ball can be secured by the coupling means to the main body, and an unclamped position, in which position the tow ball located in the coupling means is removeable from the coupling means, the coupling means comprising:
    a moveable clamping portion, and
    a fixed clamping portion,
    wherein in the unclamped position the moveable clamping portion and the fixed clamping portion are sufficiently spaced apart from each other to enable the tow ball to be inserted between the moveable clamping portion and fixed clamping portion, and in the clamped position the moveable clamping portion and the fixed clamping portion are coupled together to enable the tow ball to be secured in between the moveable clamping portion and fixed clamping portion;
  a lever for activation of the coupling means to move the coupling means between the clamped and the unclamped positions, the lever comprising:
    a handle, and
    a pair of side portions connected to the handle, the side portions being pivotably attached to either side of the fixed clamping portion of the coupling means, and
    whereupon movement of the coupling means between the unclamped and clamped positions causes longitudinal axes of the side portions to pivot from a location parallel to a longitudinal axis of the main body to a location perpendicular to the longitudinal axis of the main body; and
  a securing means attached to the side portions of the lever, and whereupon movement of the coupling means from the unclamped to the clamped position causes the securing means to pivot with the side portions of the lever and act on the moveable clamping portion to pivot the movable clamping portion towards the fixed clamping portion, the securing means comprising:
    a U shaped catch having a U shaped portion and two joining portions, wherein the U shaped portion surrounds the moveable clamping portion and the joining portions extend adjacent the sides of the fixed clamping portion to the side portions of the lever.

2. The support as claimed in claim 1, whereupon activation of the coupling means from the unclamped to the clamped position causes the securing means to act on the moveable clamping portion to pivot the movable clamping portion from a position in which the moveable clamping portion and the fixed clamping portion are spaced apart from each other to a position in which the moveable clamping portion is coupled to the fixed clamping portion.

3. The support as claimed in claim 1, further comprising an urging means for urging the moveable clamping portion coupled to the fixed clamping portion when in the clamped position.

4. The support as claimed in claim 1, wherein the fixed clamping portion comprises a hemispherical portion shaped to receive one half of the tow ball, and the moveable clamping portion comprises a hemispherical portion shaped to receive an other half of the tow ball.

5. The support as claimed in claim 1, further comprising a collar surrounding the main body to which the coupling means is attached.

6. The support as claimed in claim 5, further comprising a locking means provided on the collar, the locking means moveable between an open position, in which position the main body is moveable within the collar, and a closed position, in which position the main body is locked at a position within the collar.

7. The support as claimed in claim 1, wherein the main body comprises a shaft having one end adapted to receive a variety of attachments.

8. The support as claimed in claim 7, further comprising an attachment for attaching to the support, the attachment comprising a work surface and at least one mounting shaft, the mounting shaft adapted to be received by the main body of the support.

9. The support as claimed in claim 8, further comprising a locking means, the locking means moveable between an open position, in which position the mounting shaft may be removed from the main body of the support when the attachment is attached to the support, and a closed position, in which position the mounting shaft may be secured to the main body of the support.

10. The support as claimed in claim 8 or claim 9, wherein the work surface comprises one of a vertical or a horizontal plate, the plate being provided with the mounting shaft.

11. The support as claimed in claim 8 or claim 9, wherein the attachment is a vice bracket.

12. The support as claimed in claim 8 or claim 9, wherein the attachment is a platform.

13. The support as claimed in claim 8 or claim 9, wherein the attachment is a road sign.

14. The support as claimed in claim 8 or claim 9, wherein the attachment is rotatable about a longitudinal axis of the support.

* * * * *